(12) United States Patent
Conrad et al.

(10) Patent No.: US 7,627,622 B2
(45) Date of Patent: Dec. 1, 2009

(54) SYSTEM AND METHOD OF CURVE FITTING

(75) Inventors: Edward W. Conrad, Jeffersonville, VT (US); James C. Douglas, Burlington, VT (US); Shawn R. Goddard, Burlington, VT (US); John S. Smyth, Milton, VT (US)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 10/904,531

(22) Filed: Nov. 15, 2004

(65) Prior Publication Data

US 2005/0108310 A1     May 19, 2005

Related U.S. Application Data

(60) Provisional application No. 60/481,642, filed on Nov. 14, 2003.

(51) Int. Cl.
*G06F 15/00* (2006.01)
(52) U.S. Cl. .................................................. 708/200
(58) Field of Classification Search .................. 708/200
See application file for complete search history.

(56) References Cited

U.S. PATENT DOCUMENTS

| | | | | |
|---|---|---|---|---|
| 5,793,380 A | * | 8/1998 | Matsuno | 345/443 |
| 6,338,926 B1 | * | 1/2002 | Ku et al. | 430/30 |
| 6,714,872 B2 | * | 3/2004 | DiFoggio et al. | 702/12 |
| 6,882,958 B2 | * | 4/2005 | Schmidt et al. | 702/179 |

FOREIGN PATENT DOCUMENTS

TW       447010 A     7/2001

* cited by examiner

*Primary Examiner*—Chuong D Ngo
(74) *Attorney, Agent, or Firm*—Anthony J. Canale (57) ABSTRACT

The invention relates to fitting a curve to a plurality of data points. A "seed curve" is determined from a first set of data points selected from the plurality of data points. From the remaining data points, data points are individually selected and a determination is made for each selected data point as to whether the data point is acceptable to be included with the first set of data points. When a data point is determined to be acceptable, the data point is included with the first set of data points to form another set of data points. After each of the other data points are evaluated for inclusion with the first set of data points, a best fit curve is determined from a final set of data points.

30 Claims, 3 Drawing Sheets

SYSTEM AND METHOD OF CURVE FITTING

The present application is a non-provisional U.S. patent application of provisional application Ser. No. 60/481,642, filed Nov. 14, 2003.

FIELD OF THE INVENTION

The field of the invention is data processing, and more particularly relates to fitting a curve to a plurality of data points.

BACKGROUND OF THE INVENTION

Fitting a curve to a plurality of data points is commonly performed in engineering applications where characterization of the plurality of data points is required in order to obtain information regarding a response of a system. For example, curve fitting of data points is performed in the field of semiconductor processing such as in controlling focus for a photolithographic tool. Image size measurement data points generated from images produced by the photolithographic tool for various focus settings can be analyzed to fit a curve to the data points in order to determine a "best focus" condition for the photolithographic tool.

According to one conventional method, a $2^{nd}$-order polynomial (i.e. parabolic model) is fit to image size measurement data points. Unfortunately, parabolic modeling is resistant to classical point-tossing methodologies, usually based upon model residuals, making it difficult to detect and discard inaccurate measurement data. The reasons for this difficulty include:

a) parabolic models are weighted heavily towards their extremes because of the squaring of the independent variable. In other words, the outermost data points have the most influence on the modeled parameters; and b) the outermost data points that have the most influence on the modeled parameters are also the most likely to be inaccurate. This is due to image quality being poor at the extremes of focus of the photolithographic tool, thus making the images difficult to measure.

In order to improve confidence in the parabolic model, and to minimize the effects of inaccurate image size measurement data points, over-sampling of the photolithographic system occurs. In a manufacturing environment, this decreases productivity which increases manufacturing costs.

Figure 1:
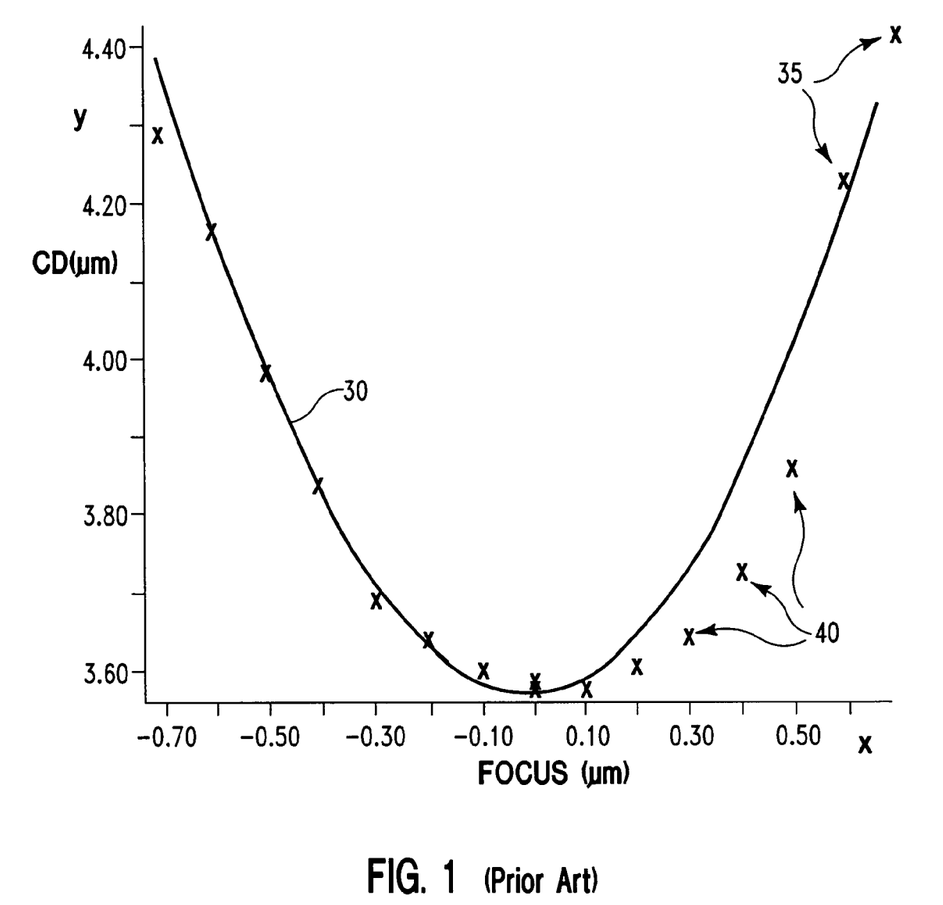
FIG. 1 illustrates a plurality of data points and a conventional curve fitting approach.

Another conventional method is to fit the image size measurement data to a 2nd-order polynomial and remove data points based upon the individual residual errors. Data at the extremes of focus of the photolithographic tool typically do not fit parabolic behavior due to poor image quality, thus making the images difficult to measure. Yet the $2^{nd}$-order polynomial method gives excessive weighting to the data at the extremes of focus resulting in a reduction in accuracy in the determination of best focus. For example, FIG. 1 illustrates a $2^{nd}$-order polynomial 30 fit to a plurality of measurement data points (denoted by X). Data points 35 at the extremes of focus are given excessive weighting such that data points 40 are erroneously removed and are not included in the determination of the $2^{nd}$-order polynomial 30.

Yet another conventional method is to fit the image size measurement data to a 4th-order polynomial or fit the image size measurement data to a $4^{th}$-order polynomial and remove data points based upon the individual residual errors. The $4^{th}$-order polynomial method accommodates the data points at the extremes of focus at the expense of the center data points where best focus is typically located. As described above with reference to the $2^{nd}$-order polynomial, data at the extremes of focus of the photolithographic tool typically do not fit parabolic behavior due to poor image quality. Thus, the $4^{th}$-order polynomial method also gives excessive weighting to the data at the extremes of focus resulting in a reduction in accuracy in the determination of best focus.

What is required is a method to fit a curve to a plurality of data points where the effect of a one or more inaccurate data points is reduced.

BRIEF DESCRIPTION OF THE DRAWING

The foregoing and other features of the invention will become more apparent upon review of the detailed description of the invention as rendered below. In the description to follow, reference will be made to the several figures of the accompanying Drawing, in which.

DESCRIPTION OF THE INVENTION

An embodiment of the invention relates to an iterative process to fit a curve to a plurality of data points where the effect of one or more inaccurate data points is reduced. Inaccurate data is detected and sequentially eliminated from the inventive calculation to determine a best fit curve for the plurality of data points. The invention determines a "seed curve" from a first subset of the plurality of data points, and then tests remaining data points (i.e. data points which are not included in the first subset) for fitness of inclusion in the seed curve. Thus, the seed curve is augmented with more accurate data points in order to determine a best fit curve. Although an embodiment of the invention will be described in terms of generating a "parabolic" best fit curve for a plurality of data points, it should be understood to those skilled in the art that this invention can be applied to generate a best fit curve having other responses such as, for example, a line, a circle, a semi-circle and other such curves described by a polynomial of any order.

According to an embodiment of the invention, a plurality of data points is analyzed to determine a best fit curve for the data points. The data can be representative of image size measurements of structures formed in a photoresist layer on a semiconductor substrate at various settings of a photolithographic tool such as, for example, focus and/or exposure. The image size measurement data typically includes a subset of "well-behaved" data representing image size measurements from structures which are formed correctly and with no significant measurement error introduced by a measurement system used to provide the measurement data. The image size measurement data also typically includes a subset of more variable data (i.e. "less well-behaved") representing image size measurements from structures which are not formed correctly (i.e. out of focus), or from structures which are formed correctly but there is a significant measurement error introduced by the measurement system, or from structures which are not formed correctly and there is also a significant measurement error introduced by the measurement system.

Figure 2:
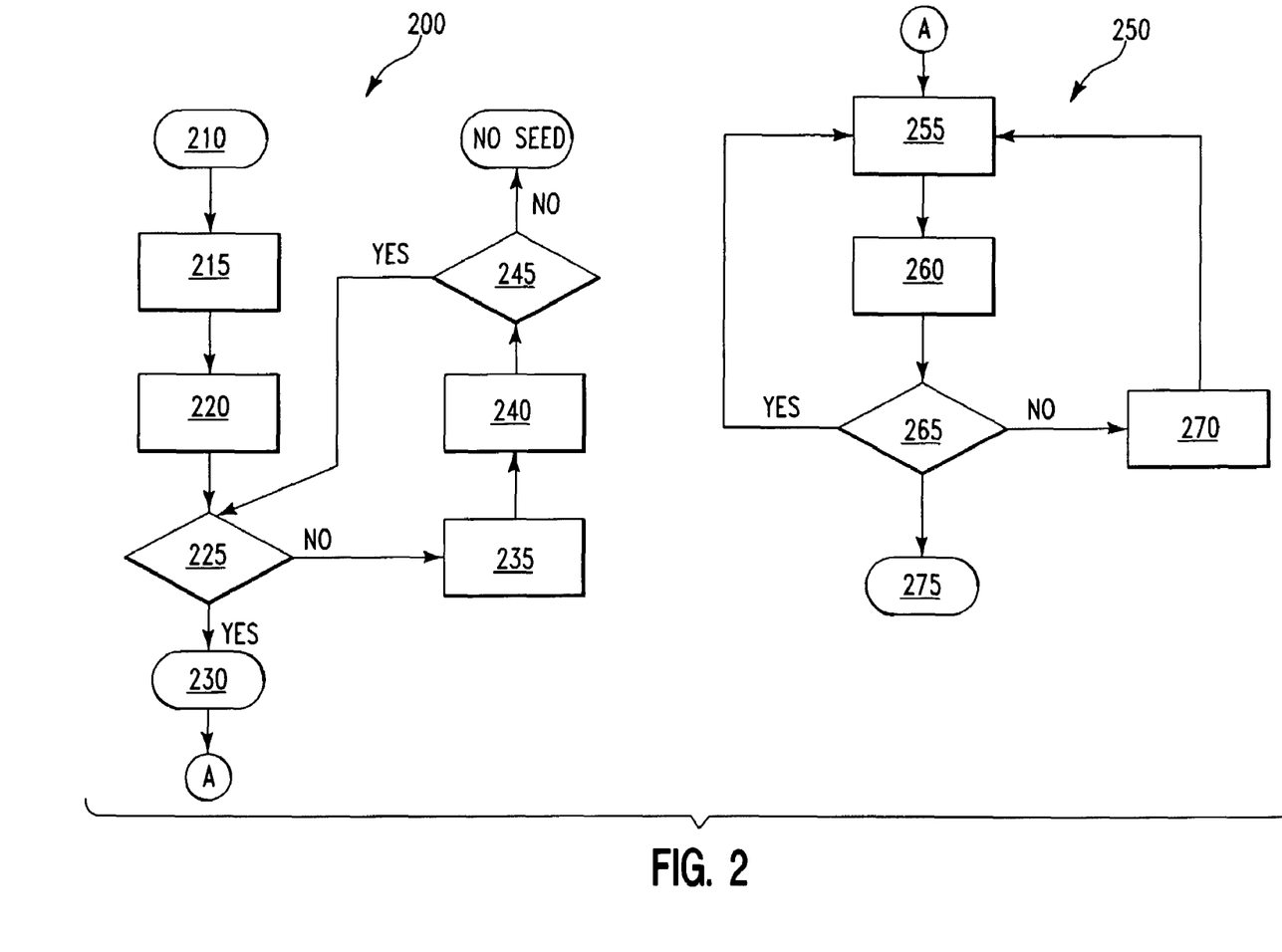
FIG. 2 flowcharts a curve fitting process according to an embodiment of the invention; and, FIG. 3 illustrates a plurality of data points and a curve fitting approach according to an embodiment of the invention.

Referring to FIG. 2, a method according to an embodiment of the invention includes, for example, a first group of steps 200 (i.e. steps 210-245) to determine a "seed curve" from a first subset of the data points, and a second group of steps 250

(i.e. steps 255-275) to determine whether a second subset of the data points can be included with the first subset of data points to form a best fit curve representing all of the data points. In step 210, any obvious inaccurate data points (i.e. "flyers") are eliminated by methods known in the art. For example, a check of the data points corresponding to extreme x-coordinate values (i.e. data points corresponding to the lowest and highest x-coordinate values) to ensure that each extreme data point is not a minimum value can be performed. If a minimum value is determined, the individual data point is eliminated from the plurality of data points. Then, a 4th-order polynomial is fit to the remaining plurality of data points and a residual error for each data point is calculated according to Equation 1. Any individual data point that has a residual error that does not satisfy a pre-determined limit is removed from the plurality of data points. The pre-determined limit can be defined by a user.

$$\text{Residual Error} = |y_i - y_{ie}| \qquad \text{Equation 1}$$

where i=1 to n data points;

$y_i$ represents the measured value of a data point; and, $y_{ie}$ represents the estimated value of the data point from the fit curve.

A next step 215 determines a "seed curve" such as, for example, a "seed parabola". A selection is made of n data points from the well behaved data points to form an initial seed parabola. In step 220, a fit curve such as, for example, a $2^{nd}$-order polynomial is fit to the n data points. An RMS (Root-Mean-Square) value of the difference between the measured value and the estimated value from the fit curve for each of the n data points is calculated according to Equation 2. According to an embodiment of the invention, a quality of fit (QoF) is defined as equaling the RMS value.

$$QoF = \text{SQR ROOT}[\Sigma(y_i - y_{ie})^2/n], \qquad \text{Equation 2}$$

where i=1 to n;

$y_i$ represents the measured value of a data point; and, $y_{ie}$ represents the estimated value of the data point from the fit curve.

This is followed by step 225 that determines if the QoF is acceptable. When the QoF satisfies a pre-determined limit set by the user, the n data points are accepted as the seed parabola in step Optionally, an r-squared analysis known in the art can be performed according to Equation 3 as a check to ensure that the seed curve has the correct shape (i.e. parabolic).

$$r^2 = 1 - [\Sigma(y_i - y_{ie})^2 / \Sigma(y_i - y_{ave})^2] \qquad \text{Equation 3}$$

where i=1 to n;

$y_i$ represents the measured value of a data point;

$y_{ie}$ represents the estimated value of the data point from the fit curve; and, $y_{ave}$ represents the average of the measured value of the n data points.

It is noted that Equations 1-3 are equations known in the art and additional details regarding the equations can be found in references such as, for example, "Introduction to Probability and Statistics", Fourth Edition, W.H. Freeman and Company, San Francisco, Calif., 1968, herein incorporated by reference.

If the QoF does not satisfy a pre-determined limit, a search of the well-behaved data points is performed in steps 235 and 240 to determine a subset "n–1", "n–2", etc. of the well-behaved data points. For example, a subset of n–1 data points is tested in step 240 as described above with respect to steps 220 and 225 for acceptability as a seed parabola. In an embodiment of the invention, all combinations of the n–1 data points are analyzed and a QoF is calculated for each of the n–1 data point combinations. When one subset of the n–1 data point combinations produces a QoF which satisfies the pre-determined limit then the one subset of n–1 data points is accepted as the seed parabola. If more than one of the subsets of the n–1 data point combinations each have a QoF which satisfies the pre-determined limit then the combination of n–1 data points that has a QoF that satisfies a second condition is accepted as the seed parabola. For example, the second condition can be that the n–1 data point combination which produces the lowest QoF is accepted as the seed parabola.

In the event that no combination of n–1 data points produces a QoF which satisfies the pre-determined value, the process proceeds iteratively to analyze all combinations of n–2, n–3, etc. data points until an acceptable seed parabola is determined or until too many data points have been eliminated (step 245).

For the case where no acceptable seed parabola has been determined, the plurality of n data points is not used to determine the seed parabola and another plurality of data points is analyzed according to the method of the invention in an attempt to determine the seed parabola. In most instances, such as when determining a "best focus" condition for a photolithographic tool, multiple sets of data points are typically available for analysis and, as such, when one set of data points can not be used to determine a seed parabola there are other sets of data points which can be analyzed and most likely at least one set of data points will produce an acceptable seed parabola.

When an acceptable seed parabola is determined according to the first group of steps 200, additional data points are then selected for inclusion with the data points that define the seed parabola according to the second group of steps 250. In step 255, a data point from the remaining data points that were not included in the determination of the seed parabola is selected as a candidate for inclusion with the m data points which form the seed parabola, where m represents the number of data points (i.e. n, n–1, n–2, etc.) from the first group of steps 200. In a next step 260, a fit curve such as, for example, a $2^{nd}$-order polynomial curve is fit to the resulting m+1 data points, and the m+1 data points are tested for acceptability as described above with respect to step 220. Whether the QoF of the m+1 data points satisfies a pre-determined limit is determined in step 265. If the QoF satisfies the pre-determined limit then the $2^{nd}$-order polynomial fit curve based on the m+1 data points is acceptable and the data point is included with the m+1 data points. If the QoF does not satisfy the pre-determined limit then the $2^{nd}$-order polynomial fit curve based on the m+1 data points is not acceptable and the data point is not included with the m+1 data points (step 270). Steps 255, 260, 265, 270 are repeated until all remaining acceptable data points are included with the m data points to obtain a best fit parabolic curve for the plurality of data points.

Optionally, an r-squared analysis (see Equation 3) can be performed after all of the acceptable data points have been included with the m data points as a check to ensure that the best fit curve has a parabolic shape. Alternatively, the r-squared analysis can be performed after each acceptable data point is included with the m data points. The r-squared analysis can also be made to be an additional condition that must be satisfied in order for a data point to be included with the m data points. For example, when the r-squared analysis is performed after the QoF analysis for each data point, if a data point satisfies the pre-determined limit for QoF but does not satisfy a pre-determined limit for r-squared, the data point can be rejected for inclusion with the m data points.

An embodiment of the invention will be described with respect to determining a "best focus" condition for a photolithographic system. It should be understood to those skilled in the art that the invention can be applied to determining a best fit curve for any plurality of data such as, for example, data from a critical dimension (CD) system, film thickness measurement system and other such systems.

Integrated circuits continue to decrease in size resulting in improvements in circuit performance (i.e. speed) and a reduction in manufacturing costs. Decreasing the size of integrated circuits requires the structures such as gate conductors, interconnects (wires), trenches, etc. which form the integrated circuits to be reduced in size. An important step in forming smaller structures in a semiconductor process is photolithography. A photolithographic tool (i.e. NSR-S203B or 204B manufactured by Nikon Precision Instruments, Inc. or Micrascan 3 manufactured by Silicon Valley Group, Lithography Division (SVGL)) typically includes projection optics having a lens and a stage upon which a substrate is placed during the exposure step to "print" an image on a surface of the substrate. The ability of the photolithographic tool to form accurate images in exposed photoresist is critical for the continued reduction in integrated circuit size. Thus, control of the photolithographic tool is important to ensure that accurate images are formed, especially when the photolithographic tool is attempting to print the smallest possible structures.

Figure 3:
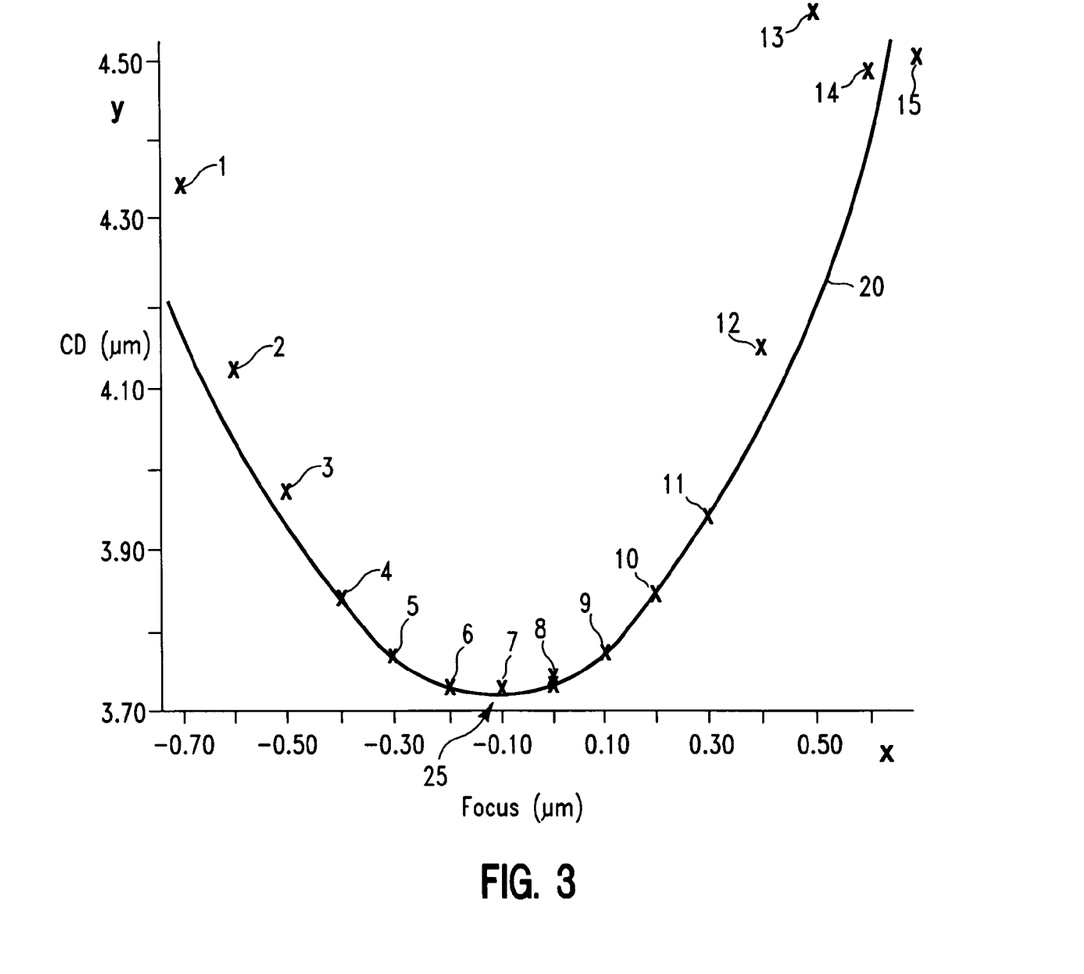

One area of photolithographic tool control is focus control. As is known in the art, focus is the distance from the lens to an upper surface of a substrate placed on the stage of the photolithographic tool and images are exposed in a photoresist layer on the upper surface. Having the correct focus setting for the photolithographic tool is important to ensure that accurate images are formed on the upper substrate surface. Conventional focus-exposure matrices (FEMs) are performed to determine a reference focus setting (also referred to as "best focus") for the photolithographic tool. FEMs generate a plurality of data points representing image size measurements corresponding to various focus and exposure (i.e. dose) settings of the photolithographic tool. Typically, an exposure setting is determined prior to performing the FEM resulting in data generated from the FEM that shows the focus response of the photolithographic tool for a fixed exposure setting as shown in FIG. 3. Data points 1-15 represent measured image size values (CD) corresponding to various focus settings (Focus) for the photolithographic tool graphed on an x-y plot. The units for both the x (Focus) axis and the y (CD) axis are micrometers (um).

The focus response data from the FEMs is analyzed to determine the "best focus" setting (described in more detail herein below). As the need to print smaller and accurate images increases so does the requirement to decrease the error in the determination of the best focus setting. In one operating condition, the photolithographic tool is required to have a focus setting for the photolithographic tool be set within a tolerance of +/−0.09 um (or +/−90 nm) of the best focus condition in order for accurate images to be printed by the photolithographic tool. The inclusion of inaccurate image size measurement data results in a reduction in accuracy in the determination of best focus setting. In a conventional analysis of the focus response, inclusion of inaccurate image size measurement data can introduce an error of as much as 20% of the focus tolerance (i.e. +/−20 nm) in the calculation of best focus which can result in an incorrect best focus setting for the photolithographic tool. With an incorrect best focus setting for the photolithographic tool, printed image quality is negatively affected resulting in reduced product yield and increased manufacturing costs.

EXAMPLE

An example to illustrate an embodiment of the invention will be discussed with respect to determining a "best focus" condition for a photolithographic tool. The example is meant to be illustrative of an embodiment of the method of the invention described with reference to the steps shown in FIG. 2 and, as such, details of calculations using Equations 1-3 described herein above are not shown for the sake of clarity.

Referring to FIG. 3, data points 1-15 include well behaved data points such as, for example, data points 6, 7, 8, and less well-behaved data points such as, for example, data points 14 and 15. For image size measurement data related to the photolithographic tool, well behaved data points usually have the lowest image size measurements (or the highest image size measurements for different process or tool settings). As described with respect to FIG. 2, in step 210 a check of data points 1-15 is performed to eliminate obvious inaccurate data. A check of data points 1 and 15 corresponding to extreme x-coordinate values reveals that neither data point 1 or 15 is a minimum value so data points 1 and 15 remain in the set of data points 1-15. Then, a $4^{th}$-order polynomial is fit to data points 1-15 and a residual error (see Equation 1) is calculated for each data point. The residual error of data point 1 is determined to be greater than a pre-determined maximum limit of 100 nanometers (nm) so data point 1 is eliminated. Thus, after step 210, the remaining data points comprise data points 2-15.

In step 215, a selection of n=6 data points from well behaved data points is made to form an initial seed parabola. For example, data points 5-10 are selected based on having the lowest measurement values from the well behaved data points. In step 220, a $2^{nd}$-order polynomial curve (not shown) is fit to data points 5-10. In step 225, a QoF value according to Equation 2 is calculated based on the measured and estimated CD values of data points 5-10 and a QoF is calculated to be less than a pre-determined maximum limit of 25 nm. Thus, data points 5-10 are accepted as the seed parabola in step 230. An r-squared analysis (see Equation 3) is performed on data points 5-10 and the r-squared value is calculated to be greater than or equal to a pre-determined minimum limit of 0.90 which indicates that the seed parabola is a parabolic shape.

In step 255, data points 2-4 and 11-15 which were not included in the determination of the seed parabola are selected for inclusion with data points 5-10 beginning with the data point with the lowest CD value. Thus, data point 4 is selected. In step 260, a $2^{nd}$-order polynomial curve is fit to data points 4-10, and data points 4-10 are tested for acceptability as described above with respect to step 220. In step 265, a QoF for data points 4-10 is less than the pre-determined maximum limit of 25 nm so the corresponding $2^{nd}$-order polynomial fit curve is acceptable and data point 4 is included with data points 5-10. Data point 11 is the next lowest CD value and is selected for inclusion with data points 4-10. Repeating steps 255-265 for data point 11, it is determined that a QoF for data points 4-11 is less than the pre-determined maximum limit of 25 nm so the corresponding $2^{nd}$-order polynomial fit curve is acceptable and data point 11 is included with data points 4-10. Data point 3 is the next lowest CD value and is selected for inclusion with data points 4-11. Repeating steps 255-265 for data point 3, it is determined that a QoF for data points 3-11 is greater than the pre-determined maximum limit of 25 nm so the corresponding $2^{nd}$-order polynomial fit curve is not acceptable and data point 3 is removed from data points 3-11 (see step 270). Data point 2 is the next lowest CD value and is selected for inclusion with data points 4-11. Repeating steps 255-265 for data point 2, it is determined that a QoF for data points 2 and 4-11 is greater than the pre-determined maximum limit of 25 nm so the corresponding $2^{nd}$-order polynomial fit curve is not acceptable and data point 2 is removed from data points 2 and 4-11. Likewise, data points 12, 14, 15 and 13 are selected and it is determined that none of these data points are acceptable for inclusion with data points 4-11. Thus, in step 275, all acceptable data points 4-11 have been added to the seed parabola and a best fit curve 20 is fit to data points 4-11. An r-squared analysis is performed on data points 4-11 and the r-squared value is calculated to be greater than or equal to a pre-determined minimum limit of 0.90 which indicates that best fit curve 20 is a parabolic shape as shown in FIG. 3.

The best focus setting for the photolithographic tool can be obtained from best fit curve 20 by determining the focus value corresponding to the minimum 25 of CD value as shown in FIG. 3. Accordingly, for the example described above, the best focus setting is determined to be at a focus value (i.e. x-coordinate value) of about −0.103 um corresponding to minimum 25 of CD value (i.e. y-coordinate value). Thus, the distance (i.e. z-axis) of the stage of the photolithographic tool relative to the lens is adjusted to have a best focus, or reference focus, value of −0.103 um. It is noted that in a typical FEM, more than one best fit curve 20 will be generated with each best fit curve 20 representing data from multiple field locations in an exposed image field. This is the case for a Micrascan3 photolithographic tool where multiple best fit curves 20 are analyzed and the various best focus values are used to adjust not only the distance between the stage and the lens (i.e. z-axis) but also the tilt of the stage.

With respect to a photolithographic system, an advantage of the invention over the conventional over-sampling technique is a reduction in measurement time to obtain the data points resulting in increased photolithographic tool availability for manufacturing production. Implementation of an embodiment of the invention as the focus control technique for 248/193 nm photolithographic tools in a semiconductor manufacturing facility reduced measurement sampling by approximately 33% compared to conventional methods and without degrading measurement variation. Increasing the availability of the photolithographic tool for manufacturing production reduces manufacturing costs due to an increase in product throughput for the photolithographic tool. Another advantage of the invention over the conventional $2^{nd}$-order and 4-th order polynomial methods is the invention preserves valid center data points where the condition of best focus is most likely to be found as was described with reference to FIG. 3.

As a practical matter, the invention is embodied in computer program code stored on a computer readable storage medium such as a tape, ROM, floppy disk, compact disc, and the like. A personal computer (PC) or RS6000 tool has a display, a central processor unit (CPU), memory (RAM), and input/output devices such that the medium can be read and the tool controlled as by the program code of the invention to carry out the operations described above. Alternatively, the invention could be run on a separate computer that has control inputs to the processing tool in question. The invention has been embodied in a program written in the "C" computer programming language, however those skilled in the art will realize that any computer programming language that can perform statistical calculations can be used to carry out the invention. The behavior of the program can be controlled with parameters that may be customized based on manufacturing requirements, and tool capabilities.

While the invention has been described above with reference to the preferred embodiments thereof, it is to be understood that the spirit and scope of the invention is not limited thereby. Rather, various modifications may be made to the invention as described above without departing from the overall scope of the invention as described above and as set forth in the several claims appended hereto.

What is claimed is:

1. A program storage device readable by a machine, tangibly embodying a program of instructions executable by a machine to perform a method of fitting a curve to a plurality of data points comprising:
   a) receiving a plurality of data points, wherein said plurality of data points are representative of image size measurements of structures formed on a substrate at different settings of a photolithographic tool;
   b) fitting a first curve to a first set of data points selected from said plurality of data points;
   c) including other data points from said plurality of data points that are not included in said first set of data points individually with said first set of data points in an iterative manner until an ending criteria is met to form another set of data points in response to another curve fit to said another set of data points upon each iteration that satisfies a first pre-determined condition;
   d) accepting a curve fitted immediately prior to said ending criteria being met as a best fit curve for said plurality of data points;
   e) determining a best focus condition from said best fit curve, wherein said best focus condition comprises a focus value which satisfies a third pre-determined condition; and
   f) outputting said determined focus value to said photolithographic tool, wherein a focus setting of said photolithographic tool is adjusted to said determined focus value.

2. The program storage device of claim 1 further comprising a step of eliminating one or more inaccurate data points from said plurality of data points prior to said step (b) of fitting.

3. The program storage device of claim 1, wherein said step (b) of fitting said first curve comprises the steps of:
   a1) fitting a $2^{nd}$-order polynomial to said first set of data points;
   a2) determining a root-mean-square (RMS) value according to an equation:

$QoF$=SQR ROOT $[\Sigma(y_i-y_{ie})^2/n]$, where i=1 to n, n represents a total number of data points in said first set of data points;
   $y_i$ represents a measured value of a data point; and,
   $y_{ie}$ represents an estimated value of a data point from said first curve; and
   a3) accepting said $2^{nd}$-order polynomial as said first curve in response to said QoF satisfying a second pre-determined condition.

4. The program storage device of claim 1, wherein said step (c) of including other data points comprises the steps of:
   fitting a $2^{nd}$-order polynomial to said another set of data points;
   determining a root-mean-square (RMS) value according to an equation:

$QoF$=SQR ROOT $[\Sigma(y_i-y_{ie})^2/n]$, where i=1 to n, n represents a total number of data points in said another set of data points;
   $y_i$ represents a measured value of a data point; and, $y_{ie}$ represents an estimated value of a data point from said another curve; and accepting said $2^{nd}$-order polynomial as said another curve in response to said QoF satisfying said first pre-determined condition.

5. The program storage device of claim 1, wherein said step (c) of including other data points comprises the steps of:
   c1) performing the following steps (c2) to (c4) for said each iteration:
   c2) including one of said other data points with said first set of data points to form said another set of data points;
   c3) fitting said another curve to said another set of data points; and
   c4) selectively removing said one data point from said another set of data points in response to said another curve not satisfying said first pre-determined condition, or selectively including said one data point with said another set of data points in response to said another curve satisfying said first pre-determined condition.

6. The program storage device of claim 5, wherein said step c4) of selectively removing said one data point comprises the steps of:
   determining a root-mean-square (RMS) value for said another curve according to an equation:

$QoF = \text{SQR ROOT } [\Sigma(y_i - y_{ie})^2 / n]$, where i=1 to n, n represents a total number of data points in said another set of data points;
   $y_i$ represents a measured value of a data point; and,
   $y_{ie}$ represents an estimated value of a data point from said another curve; and
   selectively removing said one data point from said another set of data points in response to said QoF not satisfying said first pre-determined condition.

7. A system comprising:
   a tool for processing a substrate;
   a central processor unit (CPU);
   memory coupled to said CPU, wherein said memory is operable to store program instructions, and wherein the CPU is operable to execute said program instructions;
   an input device for receiving a plurality of data points, wherein said plurality of data points are representative of measurements of structures formed on said substrate at different settings of said tool;
   wherein said program instructions are executable by said CPU to perform:
   a) fitting a first curve to a first set of data points selected from said plurality of data points;
   b) including other data points from said plurality of data points that are not included in said first set of data points individually with said first set of data points in an iterative manner until an ending criteria is met to form another set of data points in response to another curve fit to said another set of data points upon each iteration that satisfies a first pre-determined condition;
   c) outputting to an output device a curve fitted immediately prior to said ending criteria being met as a best fit curve for said plurality of data points, wherein said output device is coupled to said tool;
   d) determining from said best fit curve a value of a setting for said tool, wherein said value satisfies a third pre-determined condition; and
   e) outputting said determined value to said tool; and
   means for adjusting said setting for said tool to said determined value.

8. The system of claim 7, wherein:
   said tool comprises a photolithographic tool;
   said plurality of data points are representative of image size measurements of structures formed on said substrate at different focus settings of said photolithographic tool;
   said output device is coupled to said photolithographic tool;
   in said step (d), determining from said best fit curve a best focus value for said photolithographic tool, wherein said best focus value satisfies a third pre-determined condition;
   in said step (e), outputting said determined best focus value to said photolithographic tool; and
   means for adjusting a focus on said photolithographic tool to said determined best focus value.

9. The system of claim 7, wherein said program instruction of fitting said first curve comprises:
   fitting a $2^{nd}$-order polynomial to said first set of data points;
   determining a root-mean-square (RMS) value according to an equation:

$QoF = \text{SQR ROOT } [\Sigma(y_i - y_{ie})^2 / n]$, where i=1 to n, n represents a total number of data points in said first set of data points;
   $y_i$ represents a measured value of a data point; and,
   $y_{ie}$ represents an estimated value of a data point from said first curve; and
   accepting said $2^{nd}$-order polynomial as said first curve in response to said QoF satisfying a second pre-determined condition.

10. The system of claim 7, wherein said program instruction of including other data points comprises:
    fitting a $2^{nd}$-order polynomial to said another set of data points;
    determining a root-mean-square (RMS) value according to an equation:

$QoF = \text{SQR ROOT } [\Sigma(y_i - y_{ie})^2 / n]$, where i=1 to n, n represents a total number of data points in said another set of data points;
    $y_i$ represents a measured value of a data point; and,
    $y_{ie}$ represents an estimated value of a data point from said another curve; and
    accepting said $2^{nd}$-order polynomial as said another curve in response to said QoF satisfying said first pre-determined condition.

11. The system of claim 7, wherein said program instruction of including other data points comprises:
    b1) performing the following steps (b2) to (b4) for said each iteration:
    b2) including one of said other data points with said first set of data points to form said another set of data points;
    b3) fitting said another curve to said another set of data points; and
    b4) selectively removing said one data point from said another set of data points in response to said another curve not satisfying said first pre-determined condition, or selectively including said one data point with said another set of data points in response to said another curve satisfying said first pre-determined condition.

12. The system of claim 11, wherein said step (b4) of selectively removing said one data point comprises the steps of:
    determining a root-mean-square (RMS) value for said another curve according to an equation:

$QoF = \text{SQR ROOT } [\Sigma(y_i - y_{ie})^2 / n]$, where i=1 to n, n represents a total number of data points in said another set of data points;

$y_i$ represents a measured value of a data point; and, $y_{ie}$ represents an estimated value of a data point from said another curve; and selectively removing said one data point from said another set of data points in response to said QoF not satisfying said first pre-determined condition.

13. A method of determining a best focus condition for a photolithographic tool, the method comprising:
 a) providing a substrate including a photoresist layer patterned with a plurality of images formed at different settings of said photolithographic tool;
 b) measuring said plurality of images to obtain a plurality of image size data points, wherein said plurality of image size data points are representative of measurements of said images corresponding respectively to said different settings of said photolithographic tool;
 c) fitting a first curve to a first set of data points selected from said plurality of image size data points;
 d) including other data points from said plurality of image size data points that are not included in said first set of data points individually with said first set of data points in an iterative manner until an ending criteria is met to form another set of data points in response to another curve fit to said another set of data points upon each iteration that satisfies a first pre-determined condition;
 e) accepting a curve fitted immediately prior to said ending criteria being met as a best fit curve for said plurality of image size data points;
 f) determining a best focus condition from said best fit curve, wherein said best focus condition comprises a focus value which satisfies a third pre-determined condition;
 g) inputting said determined focus value to said photolithographic tool; and
 h) adjusting a focus of said photolithographic tool to said determined focus value.

14. The method of claim 13 further comprising a step of eliminating one or more inaccurate data points from said plurality of data points prior to said step (c) of fitting.

15. The method of claim 13, wherein said step (c) of fitting said first curve comprises the steps of:
 c1) fitting a $2^{nd}$-order polynomial to said first set of data points;
 c2) determining a root-mean-square (RMS) value according to an equation:

$QoF=\text{SQR ROOT } [\Sigma(y_i-y_{ie})^2/n]$, where i=1 to n, n represents a total number of data points in said first set of data points;

$y_i$ represents a measured value of a data point; and, $y_{ie}$ represents an estimated value of a data point from said first curve; and c3) accepting said $2^{nd}$-order polynomial as said first curve in response to said QoF satisfying a second pre-determined condition.

16. The method of claim 13 further comprising a step of calculating an r-squared value according to an equation:

$r^2=1-[\Sigma(y_i-y_{ie})^2/\Sigma(y_i-y_{ave})^2]$ where i=1 to n, n represents a total number of data points;

$y_i$ represents a measured value of a data point;

$y_{ie}$ represents an estimated value of a data point from said first or another curve; and, $y_{ave}$ represents an average of the measured value of the n data points.

17. The method of claim 13, wherein said step (d) of including other data points comprises the steps of:
 fitting a $2^{nd}$-order polynomial to said another set of data points;
 determining a root-mean-square (RMS) value according to an equation:

$QoF=\text{SQR ROOT } [\Sigma(y_i-y_{ie})^2/n]$, where i=1 to n, n represents a total number of data points in said another set of data points;

$y_i$ represents a measured value of a data point; and, $y_{ie}$ represents an estimated value of a data point from said another curve; and accepting said $2^{nd}$-order polynomial as said another curve in response to said QoF satisfying said first pre-determined condition.

18. The method of claim 13, wherein said step (d) of including other data points comprises the steps of:
 d1) performing the following steps (d2) to (d4) for said each iteration:
 d2) including one of said other data points with said first set of data points to form said another set of data points;
 d3) fitting said another curve to said another set of data points; and
 d4) selectively removing said one data point from said another set of data points in response to said another curve not satisfying said first pre-determined condition, or selectively including said one data point with said another set of data points in response to said another curve satisfying said first pre-determined condition.

19. The method of claim 18, wherein said step (d4) of selectively removing said one data point comprises the steps of:
 determining a root-mean-square (RMS) value for said another curve according to an equation:

$QoF=\text{SQR ROOT } [\Sigma(y_i-y_{ie})^2/n]$, where i 1 to n, n represents a total number of data points in said another set of data points;

$y_i$ represents a measured value of a data point; and, $y_{ie}$ represents an estimated value of a data point from said another curve; and selectively removing said one data point from said another set of data points in response to said QoF not satisfying said first pre-determined condition.

20. The method of claim 13, wherein said ending criteria is satisfied in response to each of said other data points being evaluated for inclusion with said first set of data points.

21. The method of claim 13, wherein said plurality of images correspond respectively to a plurality of focus settings of said photolithographic tool.

22. The method of claim 13, wherein a best focus condition comprises an estimated focus value from said best fit curve corresponding to a minimum or maximum of said best fit curve.

23. A method comprising:
 a) providing a substrate including a plurality of structures formed thereupon, said plurality of structures formed at different settings of a process tool;
 b) measuring said plurality of structures to obtain a plurality of data points, wherein said plurality of data points are representative of measurements of said structures corresponding respectively to said different settings of said process tool;
 c) fitting a first curve to a first set of data points selected from said plurality of data points;

d) including other data points from said plurality of data points that are not included in said first set of data points individually with said first set of data points in an iterative manner until an ending criteria is met to form another set of data points in response to another curve fit to said another set of data points upon each iteration that satisfies a first pre-determined condition;

e) accepting a curve fitted immediately prior to said ending criteria being met as a best fit curve for said plurality of data points;

f) determining an operating condition for said process tool from said best fit curve, wherein said operating condition comprises a value for a setting of said process tool obtained from said best fit curve which satisfies a third pre-determined condition;

g) inputting said determined value to said process tool; and h) adjusting said setting of said process tool to said determined value.

24. The method of claim 23 further comprising a step of eliminating one or more inaccurate data points from said plurality of data points prior to said step (c) of fitting.

25. The method of claim 23, wherein said step (c) of fitting said first curve comprises the steps of: c1) fitting a $2^{nd}$-order polynomial to said first set of data points; c2) determining a root-mean-square (RMS) value according to an equation:

$$QoF = \text{SQR ROOT } [\Sigma(y_i - y_{ie})^2 / n],$$

where $i=1$ to $n$, $n$ represents a total number of data points in said first set of data points;

$y_i$ represents a measured value of a data point; and, $y_{ie}$ represents an estimated value of a data point from said first curve; and c3) accepting said $2^{nd}$-order polynomial as said first curve in response to said QoF satisfying a second pre-determined condition.

26. The method of claim 23 further comprising a step of calculating an r-squared value according to an equation:

$$r^2 = 1 - [\Sigma(y_i - y_{ie})^2 / \Sigma(y_i - y_{ave})^2]$$

where $i=1$ to $n$, $n$ represents a total number of data points;

$y_i$ represents a measured value of a data point;

$y_{ie}$ represents an estimated value of a data point from said first or another curve; and, $y_{ave}$ represents an average of the measured value of the $n$ data points.

27. The method of claim 23, wherein said step (d) of including other data points comprises the steps of:

fitting a $2^{nd}$-order polynomial to said another set of data points;

determining a root-mean-square (RMS) value according to an equation:

$$QoF = \text{SQR ROOT } [\Sigma(y_i - y_{ie})^2 / n],$$

where $i=1$ to $n$, $n$ represents a total number of data points in said another set of data points;

$y_i$ represents a measured value of a data point; and, $y_{ie}$ represents an estimated value of a data point from said another curve; and accepting said $2^{nd}$-order polynomial as said another curve in response to said QoF satisfying said first pre-determined condition.

28. The method of claim 23, wherein said step (d) of including other data points comprises the steps of:

d1) performing the following steps (d2) to (d4) for said each iteration:

d2) including one of said other data points with said first set of data points to form said another set of data points;

d3) fitting said another curve to said another set of data points; and d4) selectively removing said one data point from said another set of data points in response to said another curve not satisfying said first pre-determined condition, or selectively including said one data point with said another set of data points in response to said another curve satisfying said first pre-determined condition.

29. The method of claim 28, wherein said step (d4) of selectively removing said one data point comprises the steps of:

determining a root-mean-square (RMS) value for said another curve according to an equation:

$$QoF = \text{SQR ROOT } [\Sigma(y_i - y_{ie})^2 / n],$$

where $i=1$ to $n$, $n$ represents a total number of data points in said another set of data points;

$y_i$ represents a measured value of a data point; and, $y_{ie}$ represents an estimated value of a data point from said another curve; and selectively removing said one data point from said another set of data points in response to said QoF not satisfying said first pre-determined condition.

30. The method of claim 23, wherein said ending criteria is satisfied in response to each of said other data points being evaluated for inclusion with said first set of data points.

* * * * *

UNITED STATES PATENT AND TRADEMARK OFFICE
CERTIFICATE OF CORRECTION

PATENT NO. : 7,627,622 B2 Page 1 of 1
APPLICATION NO. : 10/904531
DATED : December 1, 2009
INVENTOR(S) : Conrad et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1414 days.

Signed and Sealed this

Second Day of November, 2010

David J. Kappos
*Director of the United States Patent and Trademark Office*